O. LUYTIES.
LOCK NUT.
APPLICATION FILED MAR. 12, 1912.
1,052,601.
Patented Feb. 11, 1913.
2 SHEETS—SHEET 1.
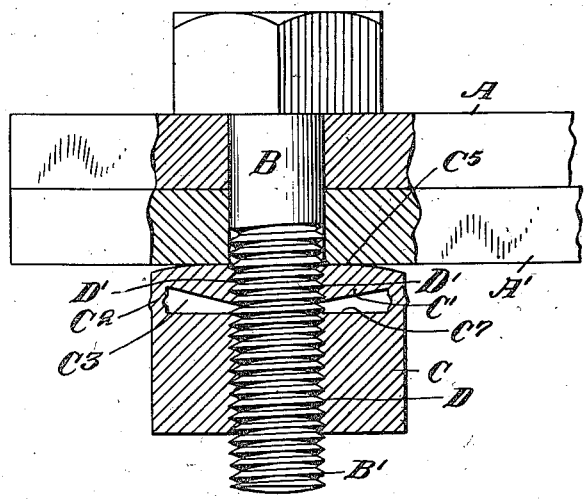
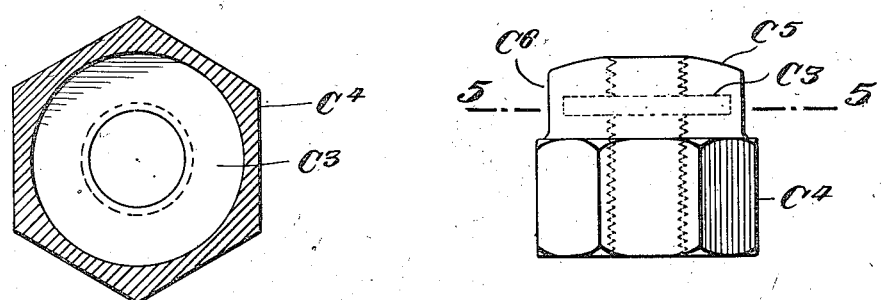
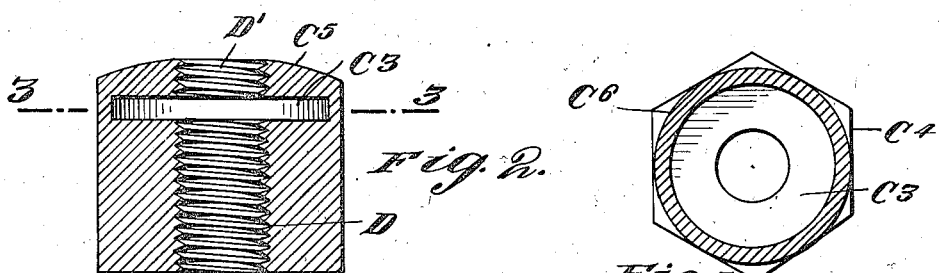
WITNESSES
INVENTOR
ATTORNEY

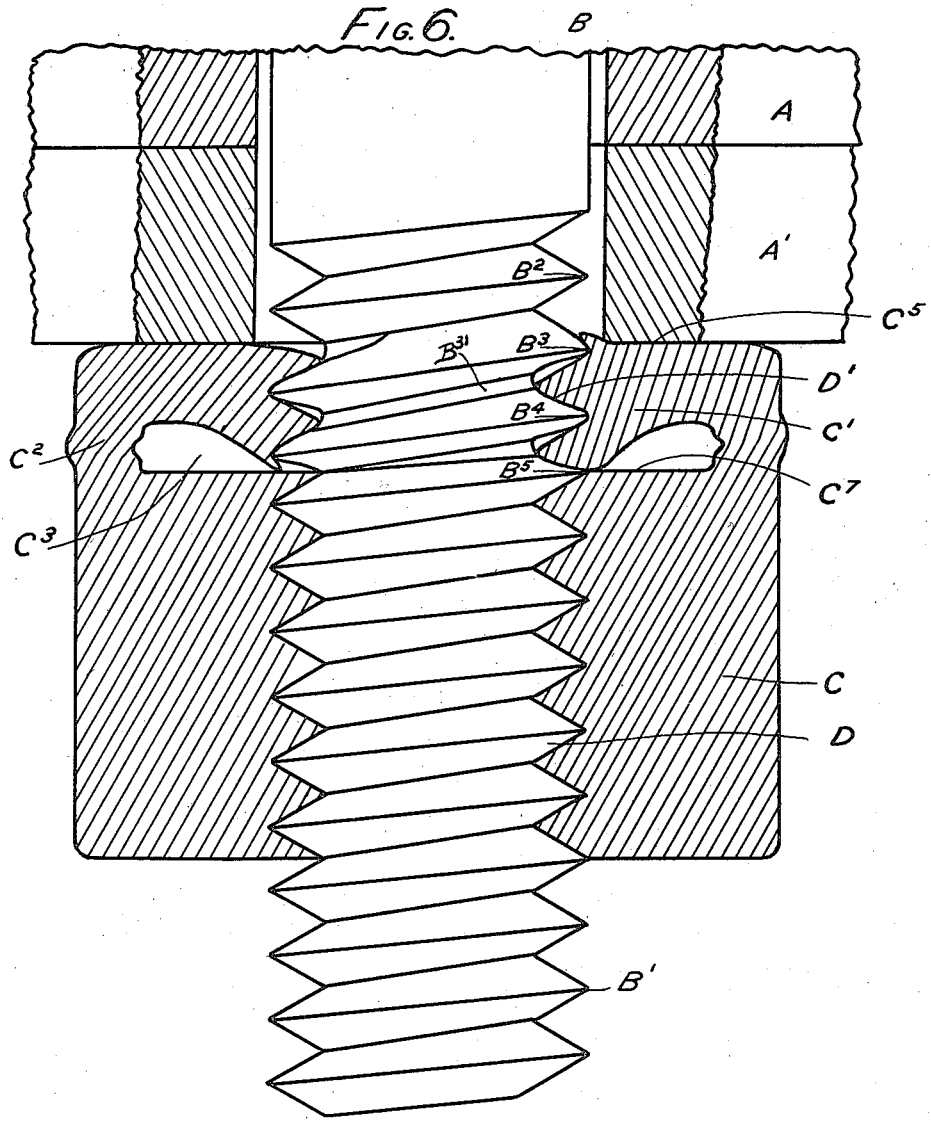

UNITED STATES PATENT OFFICE.

OTTO LUYTIES, OF NEW YORK, N. Y.

LOCK-NUT.

1,052,601. Specification of Letters Patent. Patented Feb. 11, 1913.

Application filed March 12, 1912. Serial No. 683,263.

*To all whom it may concern:*

Be it known that I, OTTO LUYTIES, a citizen of the United States, and a resident of New York city, in the county of New York and State of New York, have invented certain new and useful Improvements in Lock-Nuts, of which the following is a specification.

My invention relates to lock nuts and the object of my invention is to provide a lock nut which will automatically lock the nut to a bolt when the face of the nut is forced against an abutting surface.

A further object is to provide a lock nut formed in a single piece.

A further object is to provide a lock nut that will permanently change or distort the continuity of the thread of the bolt and of the nut for a limited distance when the nut is being set in locked position.

Referring to the drawings which form a part of this specification, Figure 1 is a sectional view of a lock nut in locked relation on a bolt and disclosing my invention. Fig. 2 is a sectional view showing the form of the nut before it is locked to a bolt. Fig. 3 is a cross sectional view on line 3—3 of Fig. 2. Fig. 4 is a view of the exterior appearance of the lock nut, the dotted lines indicating the threads and groove formed in the nut, the hexagonal faces in this form being rounded off adjacent to the locking portion of the nut. Fig. 5 is a cross sectional view on line 5—5 of Fig. 4. Fig. 6 is a detail view on an enlarged scale indicating the distortion of the threads produced when the nut is locked in place.

A and A' indicate two sheets of iron to be bolted together, and B a bolt, the shank of which is provided with a thread B'.

C indicates the body portion of my lock nut and C' the lock portion thereof which preferably is integrally connected with the body portion C by a thin annular yielding, substantially non-resilient ring-like portion $C^2$, thus forming a groove $C^3$ around the axis of the threaded opening through the nut. The body portion C may be provided with a square or hexagon surface as indicated at $C^4$, and the face of the lock portion C' is preferably rounded or raised toward the axis of the nut as indicated at $C^5$, and the outer surface $C^6$ is preferably formed cylindrical so that the section $C^2$ may give more freely in the act of locking.

D indicates the usual internal thread of constant pitch formed in the nut and D' is a direct continuation of said thread and is preferably formed at the same time that the thread is formed in the body portion, and consists of two or more complete turns. The space $C^3$ is made quite wide and preferably is as great in width or greater than the distance corresponding to two threads of the nut.

The nut is screwed on the bolt with the face $C^5$ toward the abutting surface of the sheet A' and screwed against said sheet with sufficient force to bend the ring portion $C^2$ and sometimes to permanently distort same as indicated in Fig. 1. The face of the lock portion C' is forced toward the body portion causing a distortion of the continuity of the threads formed in the lock portion relatively to the body portion and causing the lock portion to take a permanent seat in locked relation to the bolt as indicated in Fig. 1.

By exerting sufficient pressure on the body portion, the under side of the lock portion C' can be forced down into contact with the top portion $C^7$ and in this event the thread of the lock portion of the bolt within said lock portion becomes badly distorted and bodily shifted under some conditions depending on the toughness of the metal, but in view of the fact that the body portion C is provided with a comparatively long thread, the strength of the nut and bolt is not seriously impaired and the nut as a whole becomes firmly and permanently locked to the bolt.

Referring to the enlarged detail view shown in Fig. 6, it will be noted that the thread $B^4$ of the bolt has been shifted bodily toward thread $B^5$ as indicated by the space $B^{31}$ between threads $B^3$ and $B^4$. It will be noted also that the thread $B^3$ is somewhat distorted with reference to the adjacent thread $B^2$. Of course the threads in the locking portion C' of the nut are distorted correspondingly.

It will thus be seen that after the nut is once locked, it will be difficult to unscrew the same and the resistance offered toward its unscrewing will be permanent and will continue in any position that the nut may assume during the process of removal, even after being backed off from the abutment.

Having thus described my invention, I claim as new:—

1. A lock nut comprising a nut having a body portion and a locking portion, an annular yielding substantially non-resilient connection for connecting said two portions, the latter both having a continuous thread adapted to easily screw on a bolt.

2. A lock nut comprising a nut having a body portion and a locking portion, an annular yielding substantially non-resilient connection for connecting said two portions, the latter both having a continuous thread adapted to easily screw on a bolt, said locking portion having fewer threads than said body portion and adapted to be distorted by the comparatively larger force which is transmitted by said body portion.

3. A lock nut comprising a nut having a body portion and a locking portion, both portions having a continuous thread adapted to easily screw on a bolt, said portions being connected to each other at a plurality of points by a yielding substantially non-resilient connection, adapted to be permanently distorted by engagement with the abutment when the nut is screwed on to the bolt.

4. A lock nut comprising a nut having a body portion and a locking portion, both portions having a continuous thread adapted to easily screw on a bolt, said portions being connected to each other at a plurality of points by a yielding substantially non-resilient connection, and said locking portion having fewer threads than said body portion and adapted to be distorted by the comparatively larger force which is transmitted by said body portion.

Signed at New York city in the county of New York and State of New York this 6th day of March A. D. 1912.

OTTO LUYTIES.

Witnesses:
FRANK M. ASHLEY,
MANUEL M. VOIT.